(12) United States Patent
Kurose et al.

(10) Patent No.: US 7,318,283 B2
(45) Date of Patent: Jan. 15, 2008

(54) INCLINATION SENSOR

(75) Inventors: Izumi Kurose, Tottori-ken (JP);
Kazuhiro Eiji, Kurayoshi (JP);
Hideyuki Nakao, Kurayoshi (JP);
Haruki Muraoka, Tottori-ken (JP)

(73) Assignee: Omron Corporation, Kyoto (JP)

( * ) Notice: Subject to any disclaimer, the term of this patent is extended or adjusted under 35 U.S.C. 154(b) by 323 days.

(21) Appl. No.: 11/228,819

(22) Filed: Sep. 16, 2005

(65) Prior Publication Data
US 2007/0251108 A1 Nov. 1, 2007

(30) Foreign Application Priority Data
Sep. 22, 2004 (JP) ............................. 2004-275356

(51) Int. Cl.
*G01C 9/02* (2006.01)
(52) U.S. Cl. ............................... 33/366.24; 33/366.11; 33/366.27; 33/355 R; 33/391; 33/401
(58) Field of Classification Search ............. 33/366.24, 33/366.11, 366.27, 344, 345, 355 R, 365, 33/358, 359, 361, 362, 391, 401, DIG. 1
See application file for complete search history.

(56) References Cited

U.S. PATENT DOCUMENTS

| 2,572,766 | A | * | 10/1951 | Rylsky ........................ 33/345 |
| 3,233,235 | A | * | 2/1966 | Wright .................... 33/366.24 |
| 4,584,778 | A | * | 4/1986 | Komasaku et al. ...... 33/366.24 |
| 4,667,413 | A | * | 5/1987 | Pitts ............................. 33/344 |
| 4,700,479 | A | * | 10/1987 | Saito et al. ............... 33/366.24 |
| 4,811,492 | A | * | 3/1989 | Kakuta et al. ............ 33/366.25 |
| 5,174,035 | A | * | 12/1992 | Yamazaki .................... 33/395 |
| 5,574,442 | A | * | 11/1996 | Kinoshita et al. ...... 340/870.38 |
| 6,442,855 | B2 | * | 9/2002 | Takeuchi et al. ......... 33/366.19 |
| 6,499,220 | B2 | * | 12/2002 | Katsuki et al. ................ 33/391 |
| 6,826,844 | B2 | * | 12/2004 | Endo et al. ............... 33/366.24 |
| 6,987,460 | B2 | * | 1/2006 | Tews et al. .................. 340/689 |
| 7,178,377 | B2 | * | 2/2007 | Suzuki ........................ 73/1.75 |
| 2005/0198846 | A1 | * | 9/2005 | Nagata ..................... 33/366.11 |
| 2006/0137199 | A1 | * | 6/2006 | Ikuta ........................ 33/366.24 |
| 2006/0168833 | A1 | * | 8/2006 | Fulks et al. .............. 33/366.24 |

FOREIGN PATENT DOCUMENTS

JP 2000-146580 5/2000

* cited by examiner

*Primary Examiner*—G. Bradley Bennett
*Assistant Examiner*—Amy R. Cohen
(74) *Attorney, Agent, or Firm*—Osha Liang LLP

(57) ABSTRACT

An inclination sensor includes: a case having a turning shaft section projected in a lateral direction on a front surface thereof; magnetism detecting means fixed on an upper side of the turning shaft section; a pair of magnets fixed in parallel to a rear surface of the case to be located on both sides of the magnetism detecting means; a pendulum axially supported by the turning shaft section to turn freely; and a pair of ferromagnetic bodies fixed on an inward surface of the pendulum. When the case inclines, one of the ferromagnetic bodies approaches the magnetism detecting means, and a magnetic circuit is closed by the pair of magnets and one of the ferromagnetic bodies. Magnetic fluxes of the magnets pass over front and rear surfaces of the magnetism detecting means.

8 Claims, 11 Drawing Sheets

INCLINATION SENSOR

BACKGROUND OF THE INVENTION

1. Field of the Invention

The present invention relates to an inclination sensor, and more particularly to a small magnetic inclination sensor that is used in a digital camera, a video camera, and the like.

2. Description of the Related Art

Conventionally, as a small magnetic inclination sensor, there is, for example, an inclination sensor disclosed in JP-A-2000-146580. In the inclination sensor, a polarized movement is axially supported on a case to turn freely and, when the case turns by a predetermined angle or more, hall elements arranged on the case detect magnetic force of the movement. Consequently, the inclination sensor detects an inclination state of the case.

However, since the movement axially supported to turn freely is polarized, the inclination sensor is susceptible to an external magnetic field. For example, when there is a coil, a speaker, or the like generating large magnetic force near the inclination sensor, the movement is affected by the magnetic force to turn. It is likely that the inclination sensor outputs a signal indicating an inclination state despite the fact that the case is not inclined. Therefore, in using the inclination sensor, it is necessary to design the inclination sensor to avoid influence of an external magnetic field. As a result, a burden in design of an electronic apparatus incorporated with the inclination sensor is large and a degree of freedom of the design is small. In particular, when the inclination sensor is mounted on an electronic apparatus such as a digital camera, for which a reduction of size and high density of components are required, since there are many limitations, an applicable range of the inclination sensor is limited.

SUMMARY OF THE INVENTION

The invention has been devised in view of the problems and it is an object of the invention to provide an inclination sensor that is less affected by an external magnetic field and has a wide applicable range.

In order to solve the problems, an inclination sensor according to the invention includes: a case having a turning shaft section projected in a lateral direction on a front surface thereof; magnetism detecting means fixed on an upper side of the turning shaft section; a pair of magnets fixed in parallel to a rear surface of the case to be located on both sides of the magnetism detecting means; a pendulum axially supported by the turning shaft section to turn freely; and a pair of ferromagnetic bodies fixed on an inward surface of the pendulum. When the case inclines, one of the ferromagnetic bodies approaches the magnetism detecting means, and a magnetic circuit is closed by the pair of magnets and one of the ferromagnetic bodies. Magnetic fluxes of the magnets pass over front and rear surfaces of the magnetism detecting means.

According to the invention, the magnets are fixed to the rear surface of the case and are not fixed to the pendulum. Thus, unlike the conventional example, the pendulum is never affected by an external magnetic field to turn and malfunction. Therefore, in designing an electronic apparatus that is reduced in size and has high density, it is unnecessary to design the electronic apparatus to avoid influence of an external magnetic field. As a result, an inclination sensor that is convenient for use and has a wide applicable range is obtained.

As an embodiment of the invention, the magnetism detecting means may be a hall IC consisting of at least one hall element.

According to this embodiment, it is possible to detect an inclination state in both left and right directions with a small number of components.

As another embodiment of the invention, the pendulum and the ferromagnetic bodies may be integrally formed of an identical magnetic material.

According to this embodiment, an inclination sensor having a small number of components, a small number of assembly man-hours, and high productivity is obtained.

As still another embodiment of the invention, a projected portion for positional regulation may be provided on at least one of opposed surfaces of the case and the pendulum, and a recessed portion for positional regulation, in which the projected portion for positional regulation locks, may be provided on the other opposed surface.

According to this embodiment, there is an effect that the projected portion for positional regulation can lock on an inner peripheral surface of the recessed portion for positional regulation to regulate swing and turn of the pendulum and prevent malfunction.

DESCRIPTION OF THE EMBODIMENTS

Figure 1:
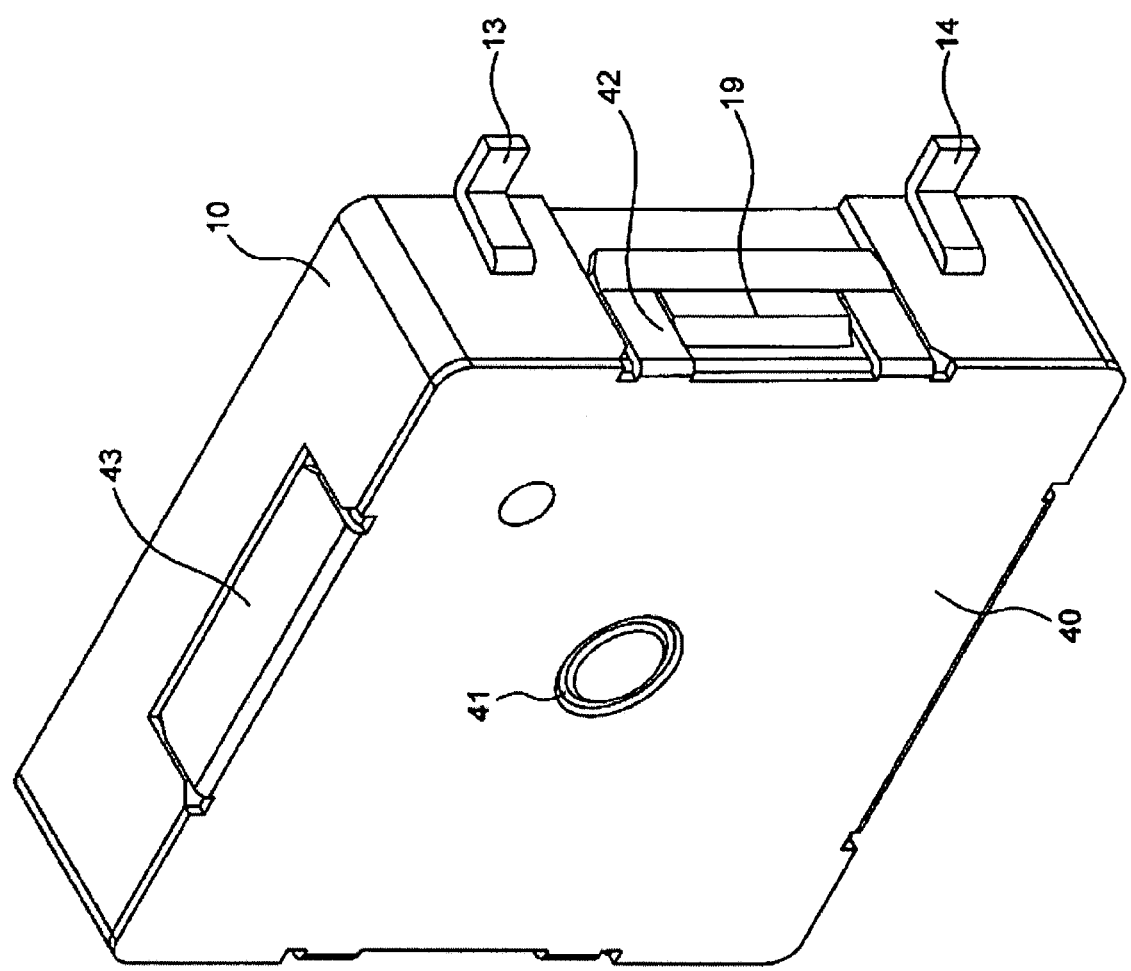
FIG. 1 is an overall perspective view showing a first embodiment of an inclination sensor according to the invention.

Embodiment of the invention will be explained with reference to the accompanying drawings.

An inclination sensor according to the first embodiment includes, as shown in FIGS. 1 to 10, a case 10, a hall IC 20 serving as magnetism detecting means, a pair of permanent magnets 25 and 26, a pendulum 30 assembled with a pair of ferromagnetic bodies 35 and 36, and a cover 40. Note that a size of an inclination sensor body according to this embodiment is 7 mm wide, 7 mm high, and 2 mm thick.

Figure 2:
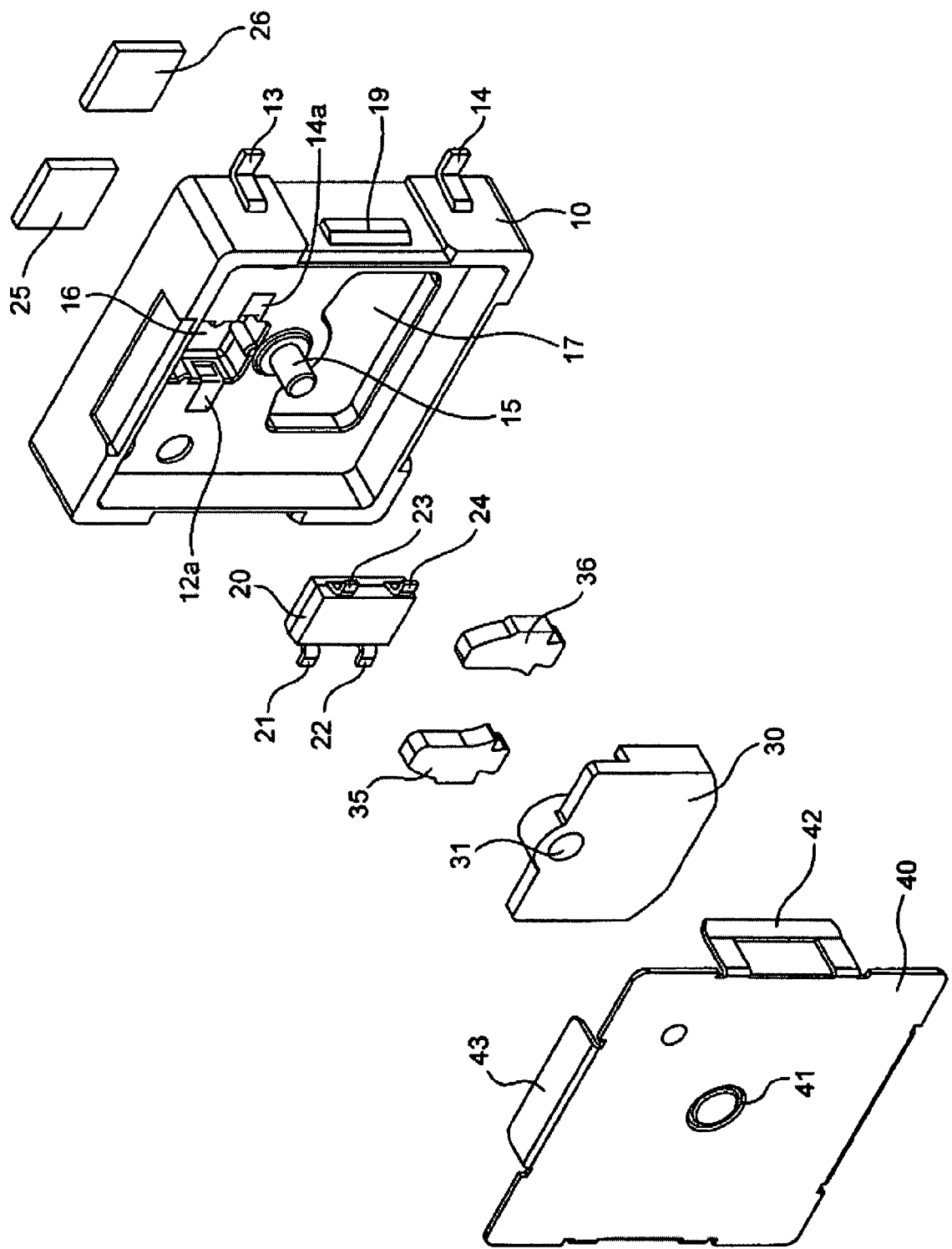
FIG. 2 is a disassembled perspective view of the inclination sensor shown in FIG. 1.
Figure 3:
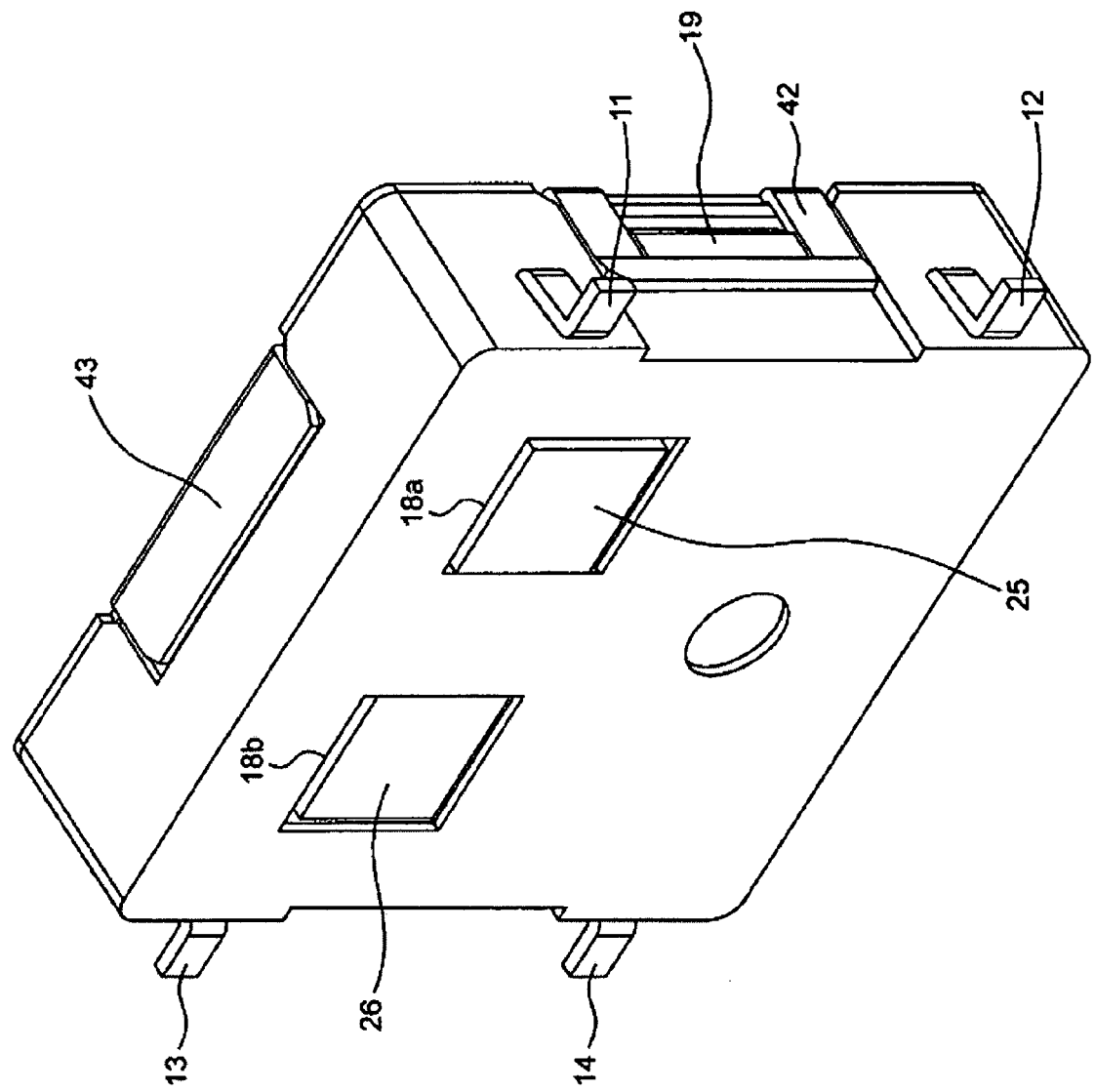
FIG. 3 is an overall perspective view of the inclination sensor shown in FIG. 1 viewed from a different angle.
Figure 4:
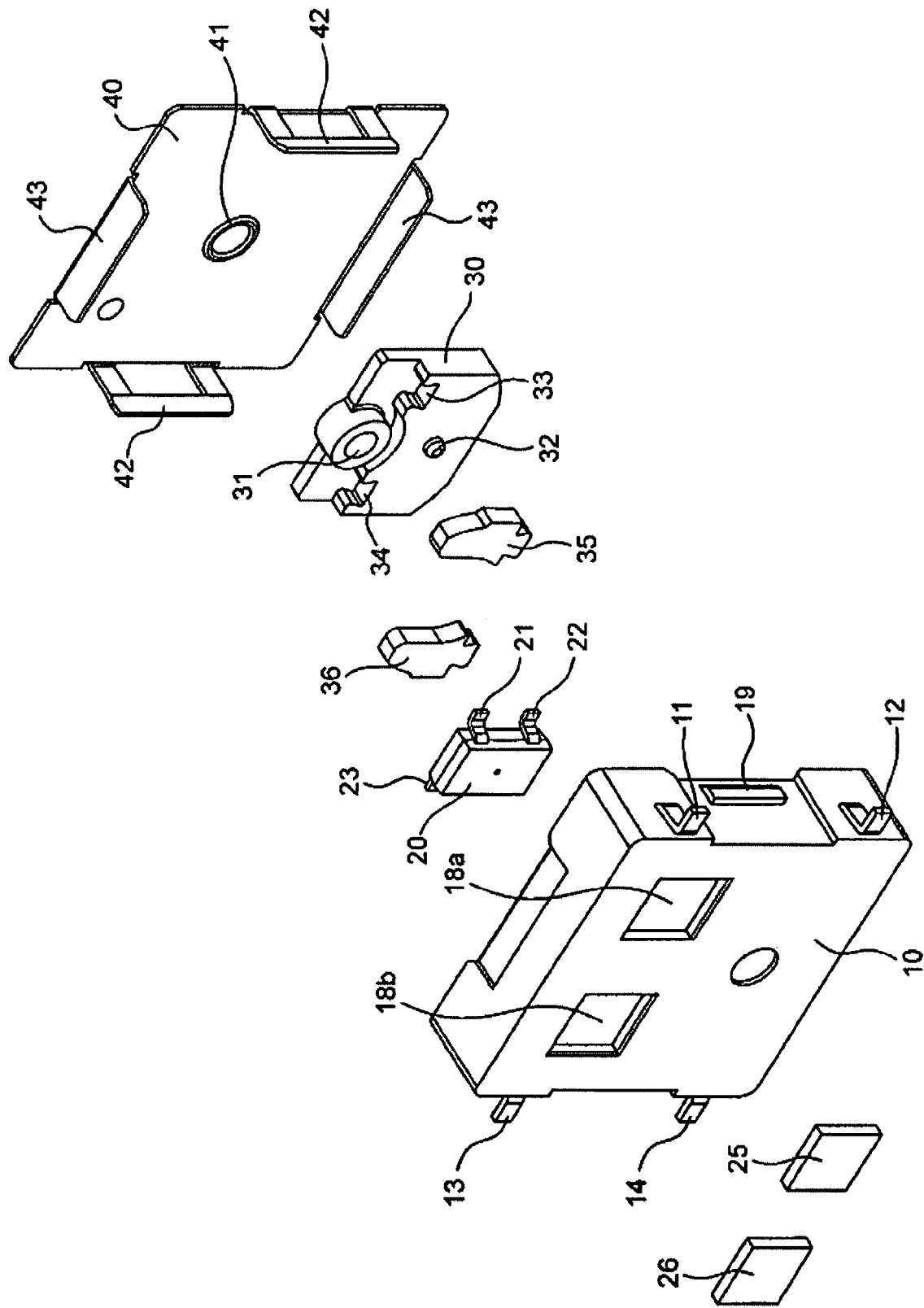
FIG. 4 is a disassembled perspective view of the inclination sensor shown in FIG. 3.

As shown in FIG. 2, the case 10 is a resin molded product having a substantially square box shape in front in which four lead terminals 11, 12, 13, and 14 are insert-molded. A turning shaft section 15 is projected in a lateral direction in a front center of the case 10. A housing recessed portion 16, which houses a hall IC 20 described later, and a recessed portion 17 for positional regulation, which positionally regulates an operation of a pendulum 30 described later, are provided in positions opposed to each other in a vertical direction across the turning shaft section 15. Connecting sections 11a to 14a of the lead terminals 11 to 14 are exposed at an opening edge of the housing recessed portion 16. As shown in FIG. 4, fitting recessed portions 18a and 18b, in which the pair of square magnets 25 and 26 are fit in and fixed, are formed on a rear surface of the case 10. On the other hand, engaging projected portions 19 are projected on outside surfaces of the case 10 opposed to each other.

The hall IC 20 has an external shape capable of housing the hall IC 20 in the housing recessed portion 16. The hall IC 20 has a circular magnetic flux detecting area (not shown) is the center thereof. Bent VSS terminal 21, OUT2 terminal 22, VDD terminal 23, and OUT1 terminal 24 are projected in a lateral direction from both the outside surfaces as lead terminals. After being fit in the housing recessed portion 16 of the case 10 and positioned, the terminals 21 to 24 are welded and electrically connected to connecting sections 11a to 14a of the lead terminals 11 to 14. Note that the hall IC 20 may be constituted by one hall element or may be constituted by two hall elements.

The pendulum 30 consists of a weak magnetic substance or a diamagnetic substance having a high specific gravity. The pendulum 30 has a bearing hole 31 that is axially supported by the turning shaft section 15 of the case 10 to be capable of turning. In addition, lower ends of the pair of ferromagnetic bodies 35 and 36 are assembled to fitting grooves 33 and 34 (see FIG. 4), which are provided on surfaces opposed to the case 10, from a lateral direction. The ferromagnetic bodies 35 and 36 are ferromagnetic bodies for forming magnetic circuits for magnetic fluxes emitted by the magnets 25 and 26. The turning shaft section 15 of the case 10 is inserted through the bearing hole 31 of the pendulum 30 assembled with the pair of ferromagnetic bodies 35 and 36, whereby the pendulum 30 is supported to be capable of turning.

Figure 5:
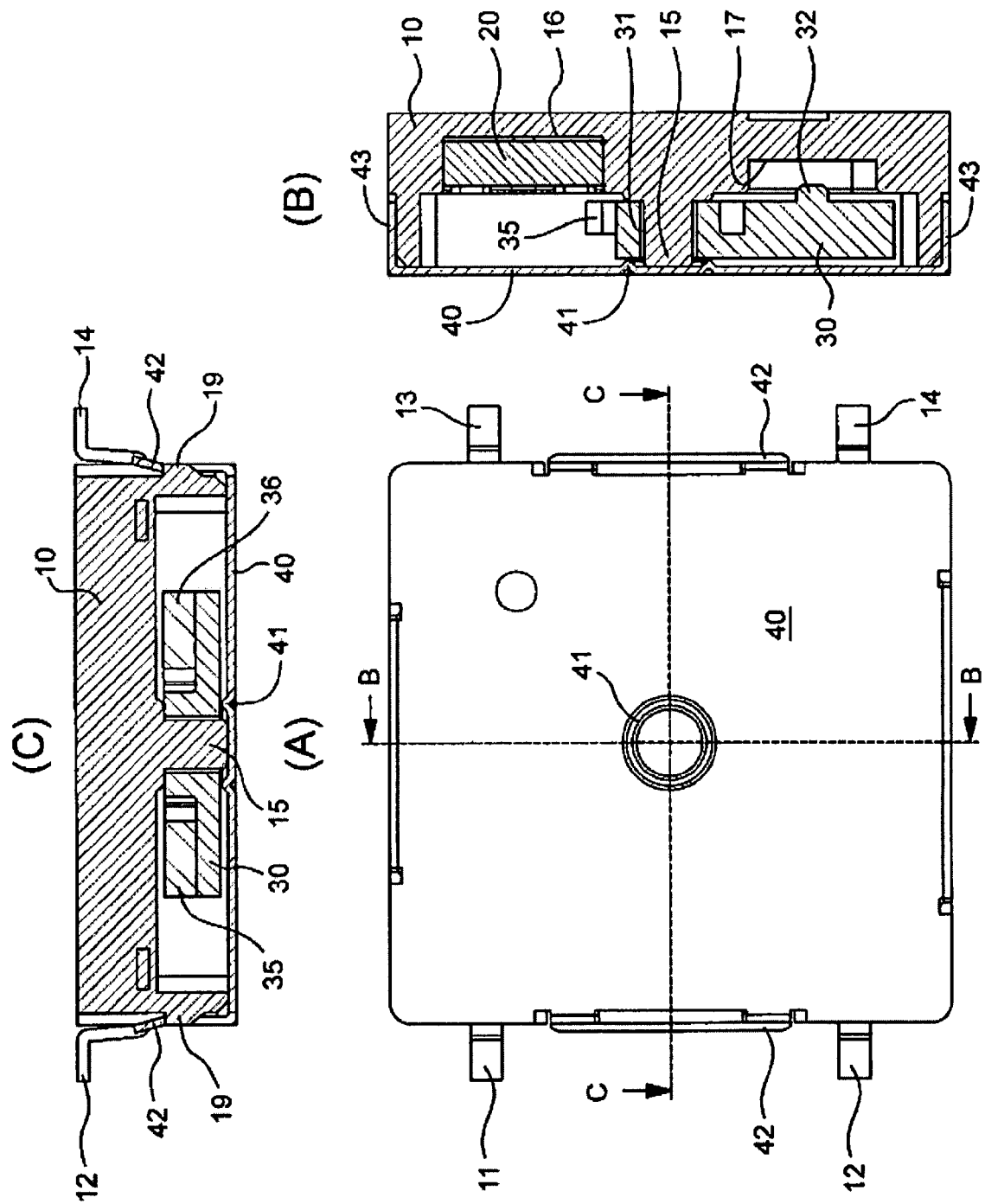
FIG. 5A is a front view of the inclination sensor shown in FIG. 1.
FIG. 5B is a longitudinal sectional view of the inclination sensor shown in FIG. 1.
FIG. 5C is a transverse sectional view of the inclination sensor shown in FIG. 1.
Figure 6:
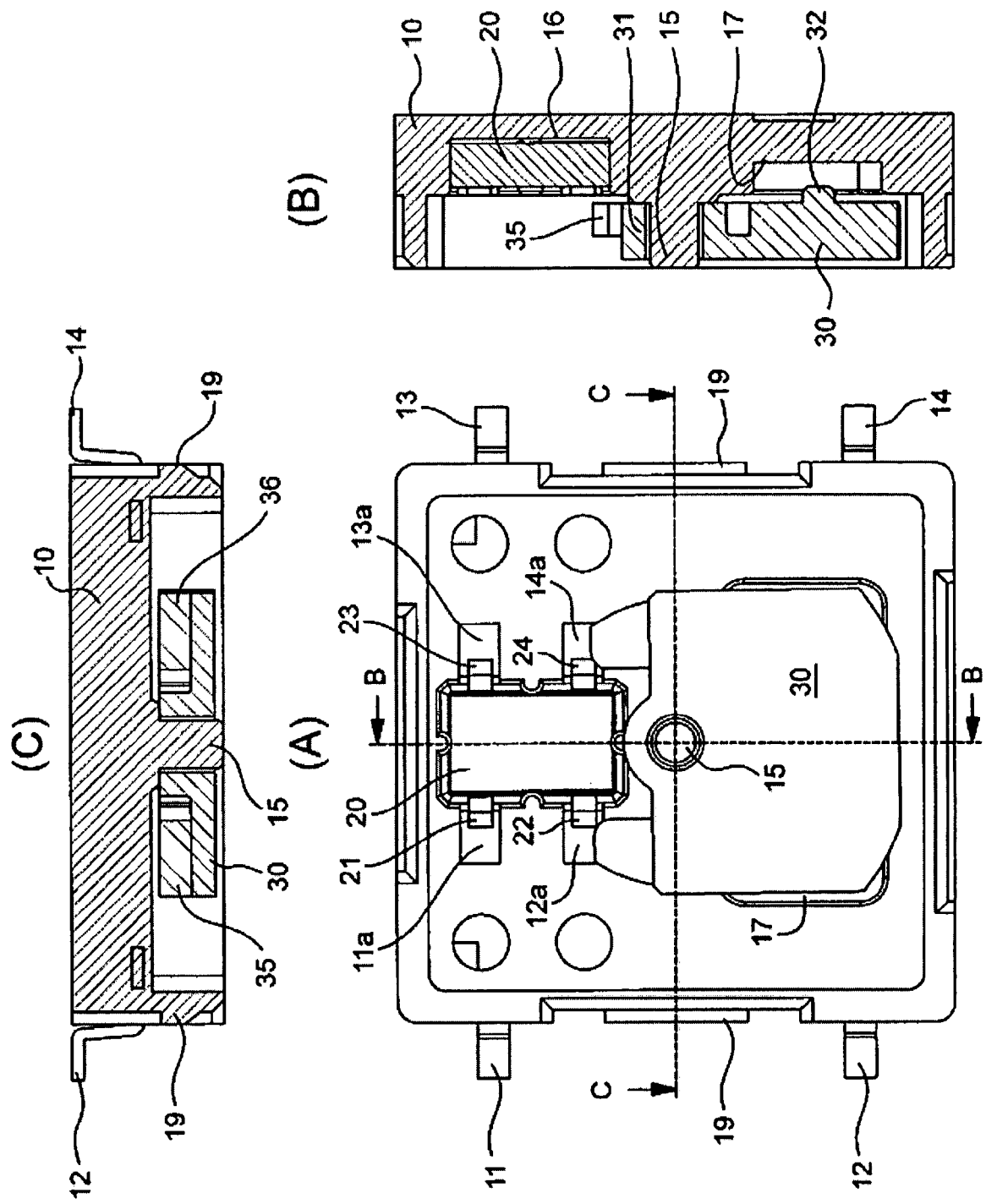
FIG. 6A is a front view of a state in which a cover is removed from the inclination sensor shown in FIG. 1.
FIG. 6B is a longitudinal sectional view of the state in which a cover is removed from the inclination sensor shown in FIG. 1.
FIG. 6C is a transverse sectional view of the state in which a cover is removed from the inclination sensor shown in FIG. 1.

The cover 40 has a front shape capable of covering a front surface of the case 10. An annular rib 41, which comes into abutment against and positionally regulates the pendulum 30, is projected in the center of the cover 40. In the cover 40, engaging pawls 42 are extended at edges on both sides opposed to each other. On the other hand, positioning ribs 43 are extended at the remaining edges on both sides opposed to each other. The engaging pawls 42 of the cover 40 are engaged with the engaging projected portions 19 of the case 10, whereby the annular rib 41 comes into abutment against the opening edge of the bearing hole 31 of the pendulum 30 to prevent the pendulum 30 from falling (FIG. 5).

Operations of the inclination sensor including the components described above will be explained.

Figure 7:
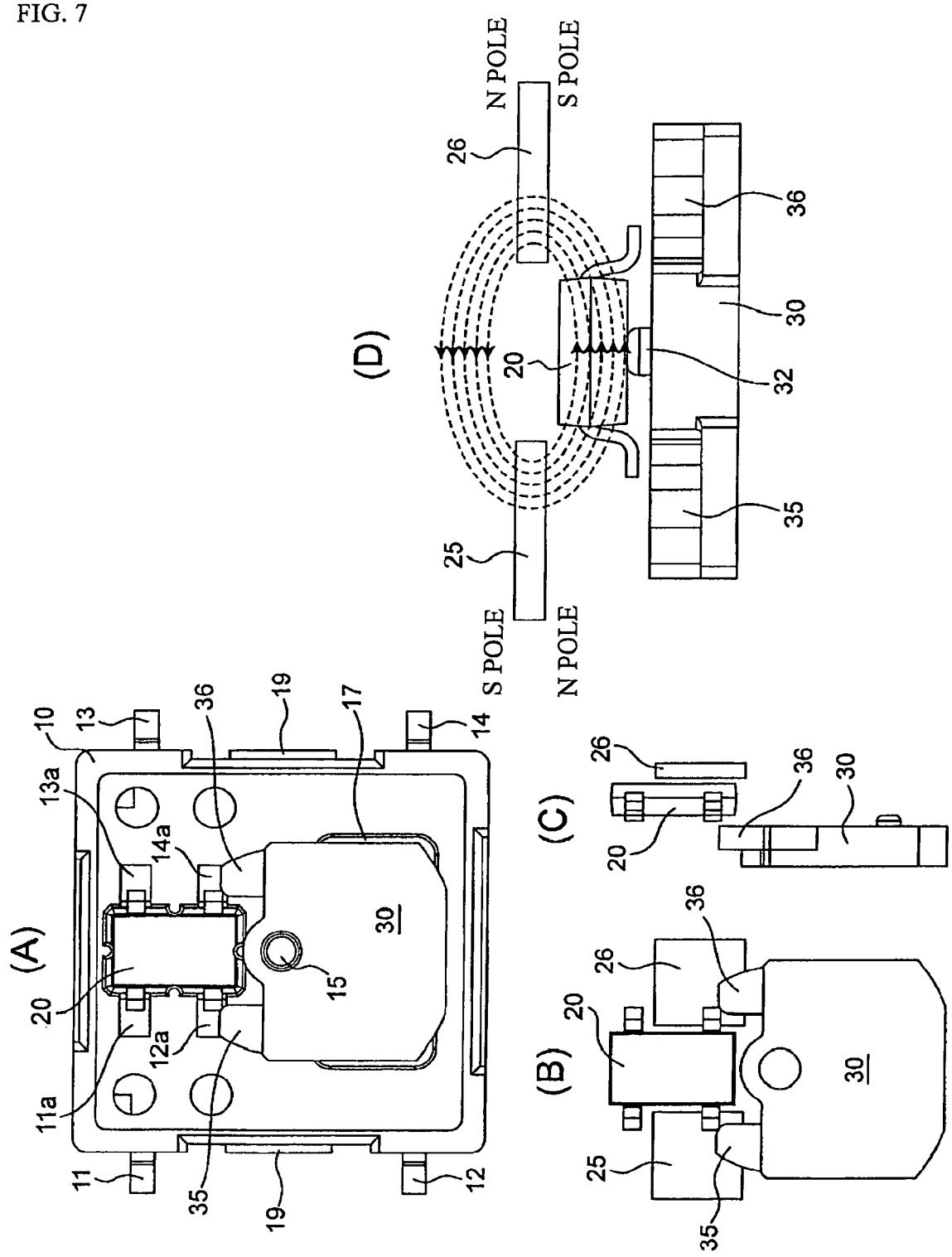
FIG. 7A is a front view of a state before the inclination sensor operates.
FIG. 7B is a schematic front view of the state before the inclination sensor operates.
FIG. 7C is a schematic right side view of the state before the inclination sensor operates.
FIG. 7D is a schematic plan view of the state before the inclination sensor operates.
Figure 10:
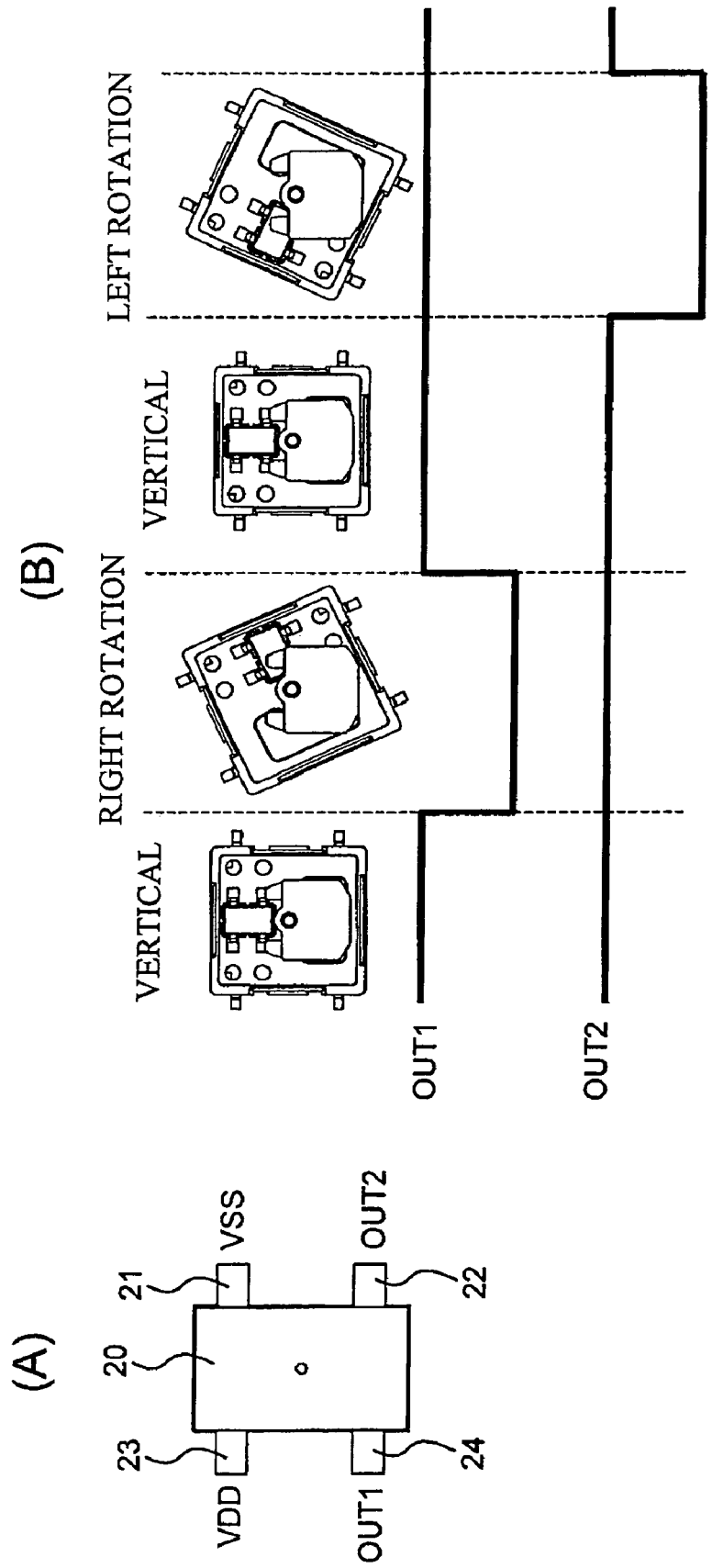
FIG. 10 is a graph of an output state in the case in which a hall IC is used as magnetism detecting means.

As shown in FIG. 7, when the case 10 is not inclined, both the ferromagnetic bodies 35 and 36 never overlap the hall IC 20. Therefore, magnetic fluxes of the magnets 25 and 26 flow piecing through both sides of the hall IC 20 to close a magnetic circuit (FIG. 7D). Therefore, an output of the hall IC 20 is always high (FIG. 10).

Figure 8:
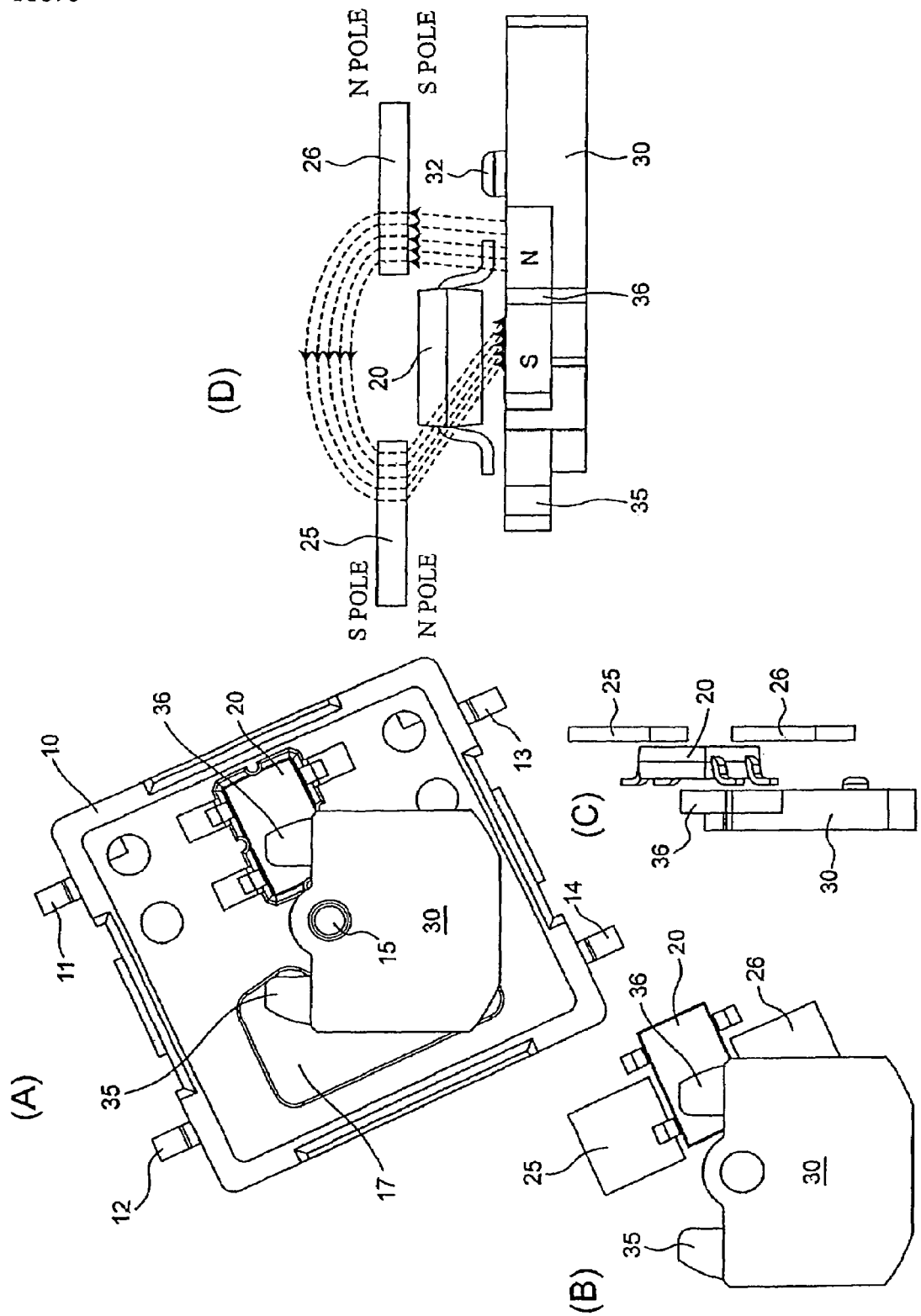
FIG. 8A is a front view of a state after the inclination sensor operates.
FIG. 8B is a schematic front view of the state after the inclination sensor operates.
FIG. 8C is a schematic right side view of the state after the inclination sensor operates.
FIG. 8D is a schematic plan view of the state after the inclination sensor operates.

As shown in FIG. 8, when the case inclines clockwise and the ferromagnetic body 36 approaches and overlaps the hall IC 20, magnetic fluxes emitted from the magnet 25 flow into the magnet 26 through the ferromagnetic body 36 to close a magnetic circuit. Therefore, the magnetic fluxes flow in from a rear surface to a front surface of the hall IC 20 crossing the hall IC 20 to form magnetic flux components perpendicular to the hall IC 20. When the magnetic flux components exceed a predetermined threshold value, the output of the hall IC 20 changes from high to low (FIG. 10).

Subsequently, when the case 10 returns to the original position, the ferromagnetic body 36 separates from the hall IC 20, a magnetic circuit is closed only by the magnets 25 and 26, and magnetic fluxes flows piecing through both the sides of the hall IC 20. Therefore, the output of the hall IC 20 changes from low to high (FIG. 10).

Figure 9:
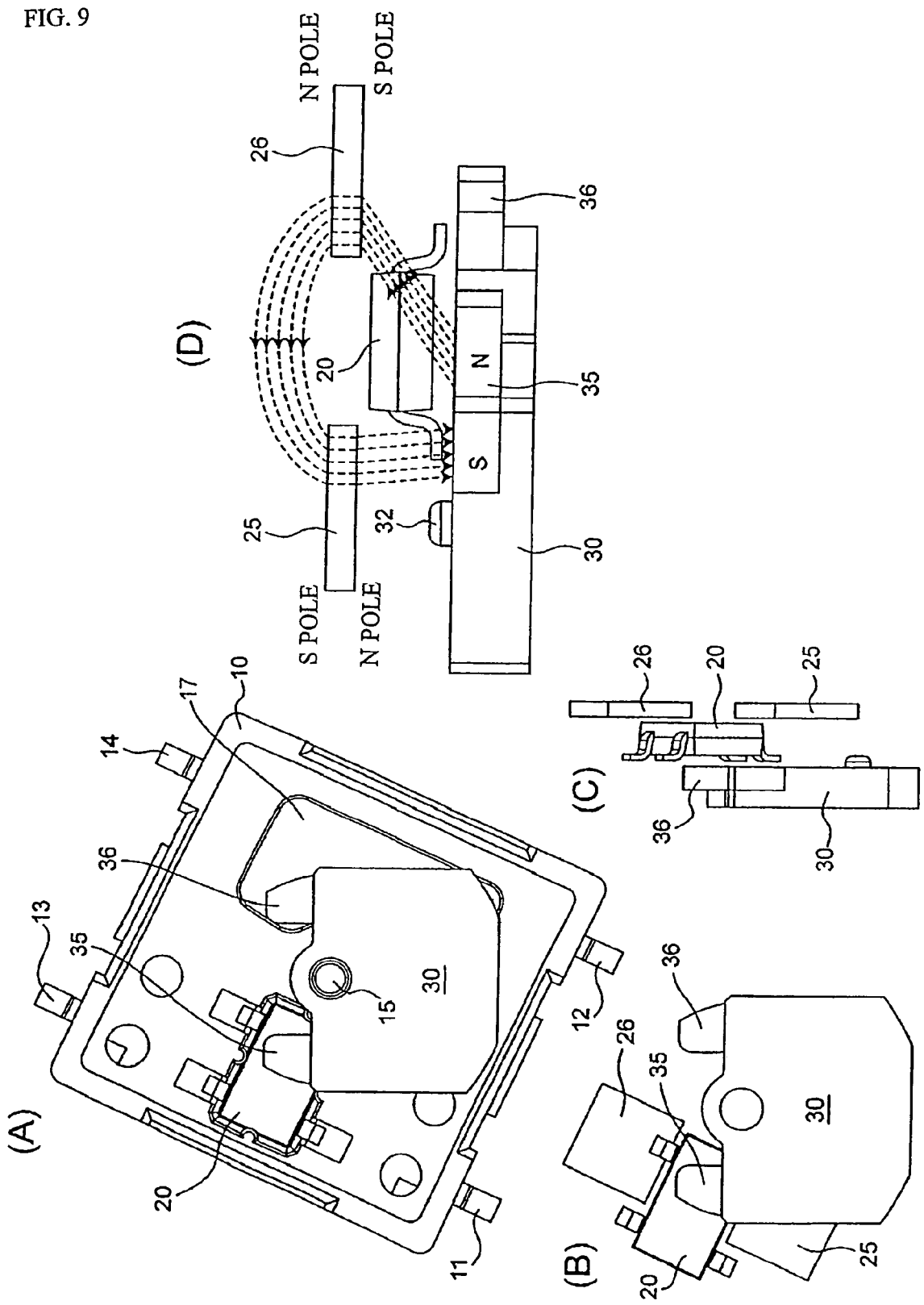
FIG. 9A is a front view of a state after the inclination sensor operates in a different direction.
FIG. 9B is a schematic front view of the state after the inclination sensor operates in a different direction.
FIG. 9C is a schematic right side view of the state after the inclination sensor operates in a different direction.
FIG. 9D is a schematic plan view of the state after the inclination sensor operates in a different direction.

Conversely, as shown in FIG. 9, when the case 10 inclines counterclockwise and the ferromagnetic body 35 approaches and overlaps the hall IC 20, magnetic fluxes emitted from the magnet 25 flow into the magnet 26 through the ferromagnetic body 35 to close a magnetic circuit. Therefore, the magnetic fluxes flow in from the front surface to the rear surface of the hall IC 20 crossing the hall IC 20 to form magnetic flux components perpendicular to the front surface of the hall IC 20. When the magnetic flux components exceed the predetermined threshold value, the output of the hall IC 20 changes from high to low (FIG. 10).

Subsequently, when the case 10 returns to the original position, the ferromagnetic body 35 separates from the hall IC 20, a magnetic circuit is closed only by the magnets 25 and 26, and magnetic fluxes flows piecing through both the sides of the hall IC 20. Therefore, the output of the hall IC 20 changes from low to high (FIG. 10).

Figure 11:
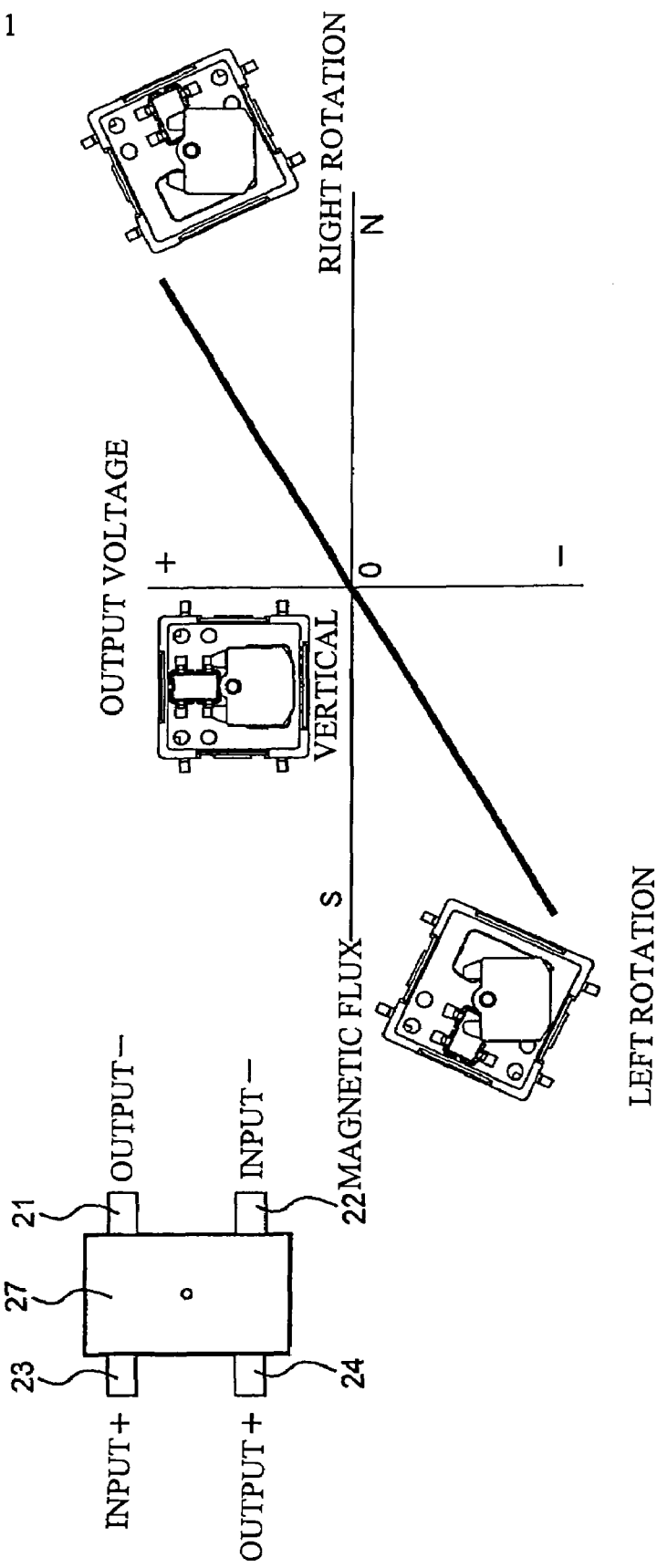
FIG. 11 is a graph of an output state in a second embodiment using a hall element as the magnetism detecting means.

In a second embodiment, as shown in FIG. 11, a hall element 25 is used as magnetism detecting means. In the hall element 25, a negative output terminal 21, a negative input terminal 22, a positive input terminal 23, and a positive output terminal 24 are projected from both outer sides thereof in a lateral direction as lead terminals. After being fit in the housing recessed portion 16 of the case 10 and positioned, the terminals 21 to 24 are welded and electrically connected to the connecting sections 11a to 14a of the lead terminals 11 to 14. Note that the magnetism detecting means may be constituted by one hall element to detect inclination states in two directions through an external control circuit or may be constituted by two hall elements to detect inclination states in two directions.

According to this embodiment, an output voltage of the hall element 25 changes linearly in position and negative areas according to an inclination angle of the case 10. Thus, there is an advantage that it is possible not only to judge inclination directions of the inclination sensor from output voltage of one hole element 25 but also to detect inclination angles one after another.

In the invention, a hall IC for detecting inclination only in one direction may be used as the magnetism detecting means. Alternatively, inclinations in two directions may be detected by two hall ICs separately.

In the explanations of the embodiments described above, the separate ferromagnetic bodies are assembled to the pendulum. However, the invention is not limited to this case. The pendulum and the ferromagnetic bodies may be integrally formed of an identical magnetic material. Consequently, there is an advantage that it is possible to obtain an inclination sensor with a small number of components and a small number of assembly man-hours.

The inclination sensor according to the invention is not limited to detection of inclination of a digital camera, a video camera, and the like. The inclination sensor can also be mounted on electronic apparatuses such as a cellular phone and a portable music player.

What is claimed is:

1. An inclination sensor comprising: a case having a turning shaft section projected in a lateral direction on a front surface thereof; magnetism detecting means fixed on an upper side of the turning shaft section; a pair of magnets fixed in parallel to a rear surface of the case to be located on both sides of the magnetism detecting means; a pendulum axially supported by the turning shaft section to turn freely; and a pair of ferromagnetic bodies fixed on an inward surface of the pendulum, wherein when the case inclines, one of the ferromagnetic bodies approaches the magnetism detecting means, a magnetic circuit is closed by the pair of magnets and one of the ferromagnetic bodies, and magnetic fluxes of the magnets pass over front and rear surfaces of the magnetism detecting means.

2. An inclination sensor according to claim 1, wherein the magnetism detecting means is a hall IC consisting of at least one hall element.

3. An inclination sensor according to claim 2, wherein the pendulum and the ferromagnetic bodies are integrally formed of an identical magnetic material.

4. An inclination sensor according to claim 3, wherein a projected portion for positional regulation is provided on at least one of opposed surfaces of the case and the pendulum, and a recessed portion for positional regulation, in which the projected portion for positional regulation locks, is provided on the other opposed surface.

5. An inclination sensor according to claim 2, wherein a projected portion for positional regulation is provided on at least one of opposed surfaces of the case and the pendulum, and a recessed portion for positional regulation, in which the projected portion for positional regulation locks, is provided on the other opposed surface.

6. An inclination sensor according to claim 1, wherein the pendulum and the ferromagnetic bodies are integrally formed of an identical magnetic material.

7. An inclination sensor according to claim 6, wherein a projected portion for positional regulation is provided on at least one of opposed surfaces of the case and the pendulum, and a recessed portion for positional regulation, in which the projected portion for positional regulation locks, is provided on the other opposed surface.

8. An inclination sensor according to claim 1, wherein a projected portion for positional regulation is provided on at least one of opposed surfaces of the case and the pendulum, and a recessed portion for positional regulation, in which the projected portion for positional regulation locks, is provided on the other opposed surface.

* * * * *